(12) United States Patent
Gierada

(10) Patent No.: US 10,972,561 B2
(45) Date of Patent: *Apr. 6, 2021

(54) METHODS AND APPARATUS FOR ADJUSTING MODEL THRESHOLD LEVELS

(71) Applicant: The Nielsen Company (US), LLC, New York, NY (US)

(72) Inventor: Sonya Gierada, London (GB)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,986

(22) Filed: Nov. 19, 2019

(65) Prior Publication Data

US 2020/0162565 A1 May 21, 2020

Related U.S. Application Data

(63) Continuation of application No. 15/377,678, filed on Dec. 13, 2016, now Pat. No. 10,491,696.

(51) Int. Cl.
*G06F 15/16* (2006.01)
*H04L 29/08* (2006.01)
(Continued)

(52) U.S. Cl.
CPC .............. *H04L 67/22* (2013.01); *H04L 67/02* (2013.01); *H04N 21/25808* (2013.01); *H04N 21/25891* (2013.01); *H04N 21/44222* (2013.01)

(58) Field of Classification Search
CPC ....... H04L 41/145; H04L 43/16; H04L 67/02; H04L 67/22
See application file for complete search history.

(56) References Cited

U.S. PATENT DOCUMENTS 7,346,615 B2   3/2008 Bem
7,347,539 B2   3/2008 Rybicki et al.
(Continued)

OTHER PUBLICATIONS

Applied Biosystems, "Data Analysis on the ABI PRISM® 7700 Sequence Detection System: Setting Baselines and Thresholds," Thermo Fisher Scientific, Version: Jun. 20, 2007, copyright 2002, 14 pages.

(Continued)

*Primary Examiner* — Moustafa M Meky
*Assistant Examiner* — Thorne E Waugh
(74) *Attorney, Agent, or Firm* — Hanley, Flight & Zimmerman, LLC

(57) ABSTRACT

Methods and apparatus for adjusting model threshold levels are disclosed. An example apparatus includes a volume estimator to determine volume estimates corresponding to a total number of users that satisfy a model threshold within a first period of time; an estimate adjuster to when a ratio of (A) modeled users that satisfy the model threshold to (B) a sum of the modeled users that satisfy the model threshold and deterministic client device users does not satisfy a minimum ratio threshold, increase the number of modeled users to satisfy the model threshold; when the total users that satisfy the model threshold does not satisfy a total volume target, increase the number of modeled users to satisfy the total volume target; and updating the total volume target based on the increased number of modeled users; an adjustment factor generator to apply an adjustment factor based on the volume estimates and the updated total volume target to an absolute count of users to generate an adjusted count of users; and a model threshold adjuster to adjust the model threshold based on the adjusted count of users.

27 Claims, 5 Drawing Sheets

(51) Int. Cl.
H04N 21/258 (2011.01)
H04N 21/442 (2011.01)

(56) References Cited

U.S. PATENT DOCUMENTS

| | | |
|---|---|---|
| 8,131,352 B2 | 3/2012 | Greene |
| 8,370,489 B2 | 2/2013 | Mazumdar et al. |
| 8,676,540 B1 | 3/2014 | Welch et al. |
| 8,973,023 B1 | 3/2015 | Rao et al. |
| 9,277,278 B2 | 3/2016 | Barney et al. |
| 9,420,320 B2 | 8/2016 | Doe |
| 9,674,195 B1 | 6/2017 | Jiang et al. |
| 9,852,163 B2 | 12/2017 | Srivastava et al. |
| 10,019,466 B2 * | 7/2018 | Huang .................... H04L 51/20 |
| 10,237,831 B2 * | 3/2019 | Zhu ..................... H04W 52/241 |
| 10,282,434 B2 * | 5/2019 | Ott ...................... H04L 67/2814 |
| 10,491,696 B2 | 11/2019 | Gierada |
| 2003/0105660 A1 | 6/2003 | Walsh et al. |
| 2013/0215006 A1 | 8/2013 | Liss et al. |
| 2013/0262181 A1 | 10/2013 | Topchy et al. |
| 2014/0118403 A1 | 5/2014 | Verthein et al. |
| 2015/0026308 A1 | 1/2015 | MacTiernan et al. |
| 2015/0195593 A1 | 7/2015 | Hoyne |
| 2015/0249577 A1 * | 9/2015 | Miyazaki ................ H04L 41/22 715/753 |
| 2015/0254709 A1 | 9/2015 | Carlyle et al. |
| 2016/0255163 A1 * | 9/2016 | Stathacopoulos ....... H04L 51/14 709/224 |
| 2017/0132658 A1 | 5/2017 | Luo et al. |
| 2017/0199905 A1 * | 7/2017 | Ott ...................... G06F 16/9024 |
| 2017/0199927 A1 * | 7/2017 | Moore ................... G06F 16/29 |
| 2017/0201851 A1 * | 7/2017 | Huang ................... G06F 16/29 |
| 2018/0006948 A1 * | 1/2018 | Torvi .................. H04L 43/0882 |
| 2018/0091390 A1 * | 3/2018 | Yang .................... H04L 43/04 |
| 2018/0317142 A1 | 11/2018 | Kumar et al. |

OTHER PUBLICATIONS

United States Patent and Trademark Office, "Non-Final Office Action", issued in connection with U.S. Appl. No. 15/377,678 dated Nov. 29, 2018, 13 pages.

United States Patent and Trademark Office, "Notice of Allowance and Fee(s) Due", issued in connection with U.S. Appl. No. 15/377,678 dated Jul. 10, 2019, 8 pages.

* cited by examiner

METHODS AND APPARATUS FOR ADJUSTING MODEL THRESHOLD LEVELS

RELATED APPLICATION

This patent arises from a continuation of U.S. patent application Ser. No. 15/377,678, entitled "METHODS AND APPARATUS FOR ADJUSTING MODEL THRESHOLD LEVELS," filed on Dec. 13, 2016. Priority to U.S. patent application Ser. No. 15/377,678 is claimed. U.S. patent application Ser. No. 15/377,678 is incorporated herein by reference in its entirety.

FIELD OF THE DISCLOSURE

This disclosure relates generally to audience measurement, and, more particularly, to methods and apparatus for adjusting model threshold levels.

BACKGROUND

Traditionally, audience measurement entities have measured audience engagement levels for media based on registered panel members. That is, an audience measurement entity (AME) enrolls people who consent to being monitored into a panel. The AME then monitors those panel members to determine media (e.g., television programs, radio programs, movies, DVDs, advertisements, streaming media, websites, etc.) presented to those panel members. In this manner, the AME can determine exposure metrics for different media based on the collected media measurement data.

Techniques for monitoring user access to Internet resources, such as webpages, advertisements and/or other Internet-accessible media, have evolved significantly over the years. Internet-accessible media is also known as online media. Some known systems monitor online media primarily through server logs. In particular, entities serving media on the Internet can use known techniques to log the number of requests received at their servers for media.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
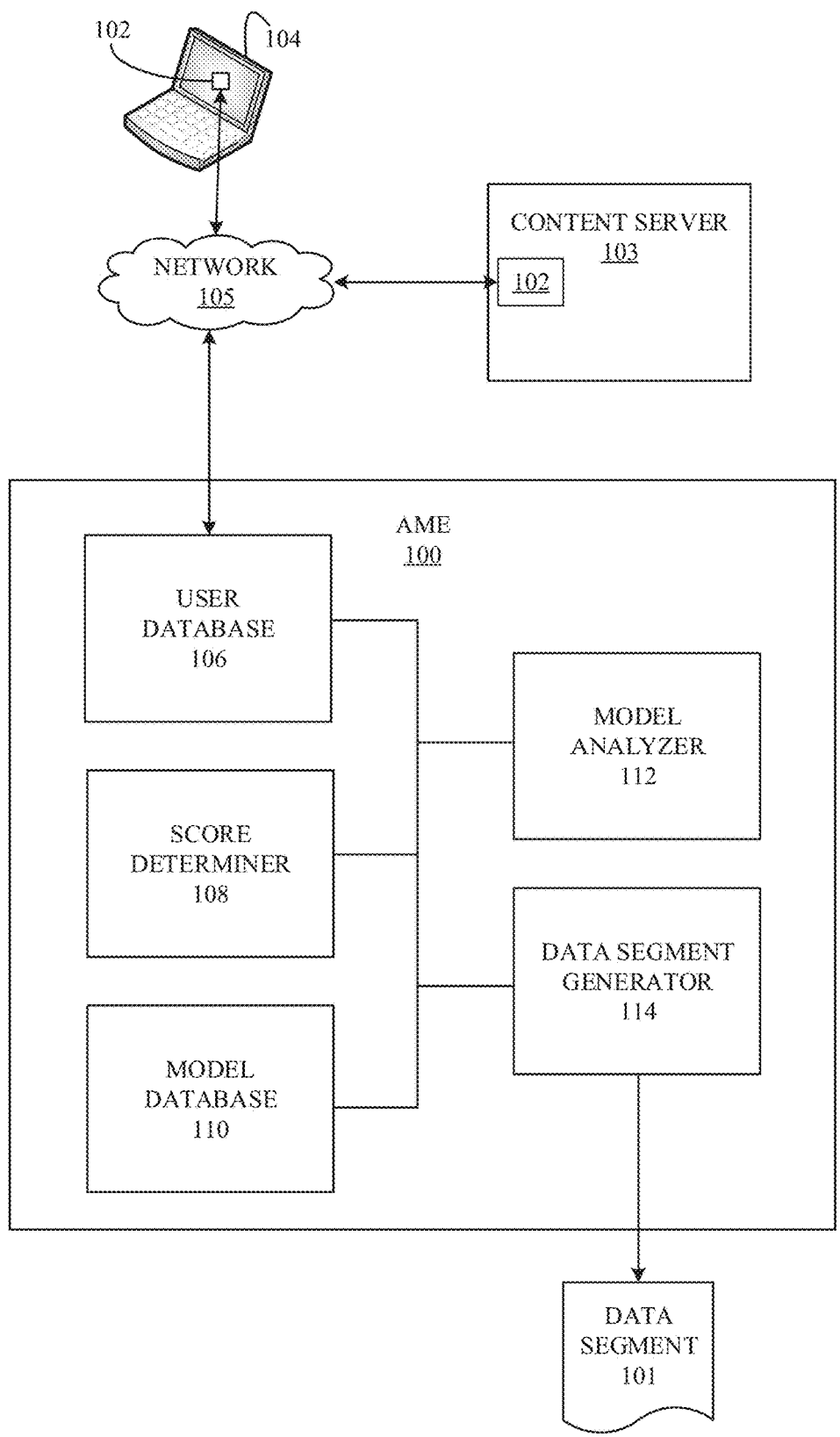
FIG. 1 is an illustration of an environment in which model threshold scores are adjusted to achieve a total volume target and a modeled volume target in a data segment.

Techniques for monitoring user access to Internet-accessible media, such as websites, advertisements, content and/or other media, have evolved significantly over the years. Internet-accessible media is also known as online media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions (also known as a media impression request) are associated with the hypertext markup language (HTML) of the media to be tracked. When a client requests the media, both the media and the impression request are downloaded to the client. The impression requests are, thus, executed whenever the media is accessed, be it from a server or from a cache.

Impression requests cause monitoring data reflecting information about an access to the media to be sent from the client that downloaded the media to a monitoring entity. Sending the monitoring data from the client to the monitoring entity is known as an impression request. Typically, the monitoring entity is an AME that did not provide the media to the client and who is a trusted (e.g., neutral) third party for providing accurate usage statistics (e.g., The Nielsen Company, LLC). Advantageously, because the impression requests are associated with the media and executed by the client browser whenever the media is accessed, the monitoring information is provided to the AME (e.g., via an impression request) irrespective of whether the client corresponds to a panelist of the AME.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), etc. These database proprietors set cookies and/or other device/user identifiers on the client devices of their subscribers to enable the database proprietor to recognize their subscribers when they visit the database proprietor website.

The protocols of the Internet make cookies inaccessible outside of the domain (e.g., Internet domain, domain name, etc.) on which they were set. Thus, a cookie set in, for example, the amazon.com domain is accessible to servers in the amazon.com domain, but not to servers outside that domain. Therefore, although an AME might find it advantageous to access the cookies set by the database proprietors, they are unable to do so.

The inventions disclosed in Mainak et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mainak et al. accomplish this task by structuring the AME to respond to impression requests from clients (who may not be a member of an audience member panel and, thus, may be unknown to the audience member entity) by redirecting the clients from the AME to a database proprietor, such as a social network site partnered with the audience member entity, using an impression response. Such a redirection initiates a communication session between the client accessing the tagged media and the database proprietor. For example, the impression response received from the AME may cause the client to send a second impression request to the database proprietor. In response to receiving this impression request, the database proprietor (e.g., Facebook) can access any cookie it has set on the client to thereby identify the client based on the internal records of the database proprietor. In the event the client corresponds to a subscriber of the database proprietor, the database proprietor logs/records a database proprietor demographic impression in association with the client/user and subsequently forwards logged database proprietor demographic impressions to the AME.

As used herein, an impression is defined to be an event in which a home or individual accesses and/or is exposed to media (e.g., an advertisement, content, a group of advertisements and/or a collection of content). In Internet advertising, a quantity of impressions or impression count is the total number of times media (e.g., content, an advertisement or advertisement campaign) has been accessed by a web population (e.g., the number of times the media is accessed). In some examples, an impression or media impression is logged by an impression collection entity (e.g., an AME or a database proprietor) in response to a beacon request from a user/client device that requested the media. In some examples, a media impression is not associated with demographics. A panelist demographic impression is a media impression logged by an AME for which the AME has panelist demographics corresponding to a household and/or audience member exposed to media. As used herein, a database proprietor demographic impression is an impression recorded by a database proprietor in association with corresponding demographic information provided by the database proprietor in response to a beacon request from a client device of a registered subscriber of the database proprietor.

In the event the client does not correspond to a subscriber of the database proprietor, the database proprietor may redirect the client to the AME and/or another database proprietor. If the client is redirected to the AME, the AME may respond to the redirection from the first database proprietor by redirecting the client to a second, different database proprietor that is partnered with the AME. That second database proprietor may then attempt to identify the client as explained above. This process of redirecting the client from database proprietor to database proprietor can be performed any number of times until the client is identified and the media exposure logged, or until all database partners have been contacted without a successful identification of the client. In some examples, the redirections occur automatically so the user of the client is not involved in the various communication sessions and may not even know they are occurring.

Periodically or aperiodically, the partnered database proprietors provide their logs and demographic information to the AME, which then compiles the collected data into statistical reports identifying audience members for the media.

Examples disclosed herein include generating models that score (e.g., from zero to one) client device identifiers based on the media output on the client device. In some examples, the client device identifiers (e.g., corresponding to client device users) are extracted from cookies and/or data logs received at the audience measurement entity from one or more database providers. Each model corresponds to a particular characteristic. For example, there may be a sports model that corresponds to sports, a luxury car model that corresponds to luxury cars, etc. The audience measurement entity generates modeled segments by scoring client device identifiers stored at the audience measurement entity according to how closely the media output by the client device relates to the particular model. The more the media output by the client device corresponds to a characteristic of the model, the higher the audience measurement entity will score the client device identifier. For example, if a user of a client device frequently visits websites associated with luxury items, the audience measurement entity will score the client device identifier with a high score (e.g., greater than 0.9) in a luxury watch model. In some examples, the audience measurement entity applies weights to client device identifiers to more closely represent a universe of users. Additionally, the audience measurement entity generates data segments that include data related to the users (e.g., both modeled and deterministic) of client devices that satisfy a model threshold. A model threshold is a particular score of a model. For example, if the model threshold is 0.75 for a model, the audience measurement entity generates a data segment including users and/or client device identifiers that received a score of 0.75 or more for the model. As time progresses, the media output by the client devices and/or the number of client device identifiers tracked by the audience measurement entity may change. These changes create fluctuation in data segments including fluctuating volume totals and fluctuating model score distributions. For example, a data segment generated for a first duration of time may include 10 million users (e.g., client device users) and the same data segment generated for a second duration of time may include 30 million users. Examples disclosed herein include adjusting the model threshold to substantially maintain a target number (e.g., volume) of users (e.g., both modeled and deterministic) in a data segment. Adjusting a model threshold in an automated fashion is herein referred to as autothresholding. As used herein, deterministic users are users that have been exposed to media corresponding to an audience segment. For examples, for the audience interest—golf, deterministic users include users that have been exposed to golf media and/or golf products (e.g., via analysis of use of a client device, data from a third-party data collector (Experian, Facebook, etc.), credit card records, GPS records, etc.). As used herein, modeled users are users that are likely to belong to an audience segment based on satisfying a threshold score (e.g., have likely been exposed to the media, but the exposure has not been verified). For example, for the golf model, modelled users may include users that have been exposed to sports media and/or media associated with golf (e.g., increasing their model score to satisfy the threshold score).

Data segments may be sold to advertising companies to provide consumer data to advertising companies. The value (e.g., demand) of such data segments corresponds to the number of users included in the data segment and the number of modeled users in the data segment (e.g., the larger the segment, the higher the demand of the segment). Accordingly, examples disclosed herein process models to increase the total number of users and/or the modeled number of users in a data segment, thereby increasing the revenue of such data segments. Examples disclosed herein adjust the model threshold score (e.g., model threshold) so that a minimum total number of users is satisfied that creates a sufficient volume to meet market demands and/or to keep total volume under control. Further, examples disclosed herein increases the number of modeled users in order to achieve a minimum modeled threshold. Examples disclosed herein track historic models, estimate future modeled and deterministic estimates, and compute adjustment factors using the historic models and modeled and deterministic estimates. Further, examples disclosed herein apply the adjustment factors to model samples to generate desired counts of users and adjust model thresholds to satisfy the desired counts of users in a segment. In this manner, examples disclosed herein are able to autothreshold in environments with fluctuating volume and model score distributions.

FIG. 1 illustrates an example environment including an example audience measurement entity 100 to adjust model thresholds to achieve a desired total volume of users in an example data segment 101. The example of FIG. 1 includes example media 102 provided by an example content server 103 to an example client device 104 via an example network 105. The example audience measurement entity (AME) 100 includes an example user database 106, an example score determiner 108, an example model database 110, an example model analyzer 112, and an example data segment generator 114 to generate the example data segment 101.

The example content server 103 of FIG. 1 provides the example media 102 to the example client device 104 via the example network 105. In some examples, the content server 103 provides the media 102 in response to a request from the example client device 104. The example media 102 may include or otherwise correspond to instructions to be executed by the example client device 104. The instructions may instruct the client device 104 to send data (e.g., including media data, client device identifiers, cookies, etc.) to the example AME 100, via the example network 105, when the example media 102 is accessed. In this manner, the example AME 100 can identify when the media 102 has been accessed by the example client device 104 and correspond the media 102 to the client device 104. Although the example described in FIG. 1 includes the example content server 103 to provide the example media 102 to the example client device 104, thereby causing the example client device 104 to transmit data to the example AME 100, there may be alternative ways of instructing the example client device 104 to transmit data to the example AME 100 when the example media 102 is accessed. For example, the client device 104 may have metering software running on the example client device 104 to transmit data whenever any media, including but not limited to the example media 102 of FIG. 1, is accessed. Alternatively, the example client device 104 may transmit the data to an additional server (e.g., a database proprietor server) and the additional server may forward the data to the example AME 100.

The example client device 104 of FIG. 1 may be any device capable of accessing the example media 102 over the example network 105 (e.g., the Internet). For example, the client device 104 may be a mobile device, a computer, a tablet, a smart television, and/or any other Internet-capable device or appliance. Examples disclosed herein may be used to collect impression information for any type of the example media 102 including content and/or advertisements. Media may include advertising and/or content delivered via websites, streaming video, streaming audio, Internet protocol television (IPTV), movies, television, radio and/or any other vehicle for delivering the example media 102. In some examples, the example media 102 includes user-generated media that is, for example, uploaded to media upload sites, such as YouTube, and subsequently downloaded and/or streamed by one or more other client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s).

The example client device 104 of FIG. 1 transmits device/user identifiers including cookies, hardware identifiers, app store identifiers, open source unique device identifiers, and/or any other type of identifier to the example AME 100 based on instructions (e.g., beacon instructions) executed by the example client device 104. In some examples, the example client device 104 transmits the identifiers to the example AME 100 whenever the example client device 104 accesses tagged media (e.g., the example media 102 after being tagged by the example AME 100). Alternatively, media exposure data from the example client device 104 may be transmitted to the example AME 100 using any alternative means including, but not limited to, through a metering device, surveys, database proprietor data, etc. In this manner, the example AME 100 can monitor and correlate user activity and/or media exposure to the example client device 104. In some examples, the AME 100 may receive device/user identifiers and/or exposure logs from a database proprietor that stores a cookie on the example client device 104.

The example network 105 of FIG. 1 is a communications network. The example network 105 allows the example media 102 from the example content server 103 to be accessed by the example client device 104 and/or allows the data from the example client device 104 to be accessed by the example the example AME 100. The example network 105 may be a local area network, a wide area network, the Internet, a cloud, or any other type of communications network.

The example AME 100 of FIG. 1 does not provide the media to the client devices 104 and is a trusted (e.g., neutral) third party (e.g., The Nielsen Company, LLC) for providing accurate media access (e.g., exposure) statistics. The example user database 106 stores media monitoring information and/or demographic information corresponding to a user(s) of the example client device 104 based on the data sent by the example client device 104 and/or a database proprietor to the example AME 100. Additionally, the example user database 106 stores media monitoring and/or demographic information corresponding to other client devices that send data. In some examples, the example user database 106 includes multiple databases. For examples, the user database 106 may include a modelled database and a deterministic database. The modelled database may include modelled segments for identifiers of client devices and/or users included in a particular model and media exposure data corresponding to the media output by the client devices. The deterministic database may include deterministic segments for identifiers for client devices that deterministically belong to a particular model (e.g., based on media exposure, third party (e.g., Experian, Facebook, etc.) data, credit data, etc.). In such examples, a client device identifier may be included in the both the modelled database and the deterministic database. For example, a user may correspond to a deterministic segment for a first model (e.g., hybrid cars) and correspond to a modelled segment for a second model (e.g., kitchen appliances).

The example score determiner 108 of FIG. 1 identifies a score for a user of the example client device 104, and all other users stored in the example user database 106, based on (A) the example media 102 that was accessed by the example client device 104 and (B) the characteristics of a model stored in the example model database 110. The score corresponds to how likely the user will relate to a particular advertisement and/or type of advertisement. For example, if the model is a luxury watch model designed to advertise to users in the market for a luxury watch, the score determiner 108 may select a very high score (e.g., 0.98) to a user who is exposed to lots of luxury items (e.g., cars, boats, houses, etc.) on the example client device 104. In such an example, the score determiner 108 may select a high score (e.g., 0.80) for a user who is exposed to some luxury items. Additionally, the example score determiner 108 may select a low score (e.g., 0.10) for a user who is not exposed to any non-luxury items on the example client device 104.

The example model database 110 of FIG. 1 stores data corresponding to various models. As described above, the models may correspond to a type of customer. The models are used to generate and/or contribute the example data segments 116 to enable advertisers to provide customized advertising to users based on their media exposure patterns. Example models may include a college student model, a luxury car model, a sports model, and/or any other type of model. In some examples, the models include a generated distribution of all the volume users identified for each score stored in the example user database 106. In some examples, the distribution is a cumulative distribution. For example, the distribution may illustrate that there are 30 million (e.g., all) users that have a 0.00 score, 29 million users that have a 0.10 or below score, . . . , 150,000 users that have a 0.90 or below score. In such examples, the raw scores are stored and the distributions are aggregated periodically and/or aperiodically.

The example model analyzer 112 of FIG. 1 adjusts model thresholds, thereby adjusting the volume of users (e.g., modelled users) included in the example data segment 101. As further described below in conjunction with FIG. 2, the example model analyzer 112 may adjust model thresholds so that the example data segment 101 includes a sufficient volume to satisfy model parameters for a particular segment set by a user and/or manufacture. For example, the example model analyzer 112 may lower a model threshold to increase the volume of (e.g., total number of users in) the example data segment 101 and/or may increase the threshold to decrease the volume of the data segment 101 based on previous and/or projected model data. Once the example model analyzer 112 adjusts a model threshold, the model analyzer 112 deploys a model with the adjusted threshold to the example data segment generator 114. The example data segment generator 114 generates the example data segment 101 based on the deployed adjusted threshold model. As described above, the example data segment 101 includes data for users (e.g., both deterministic and modeled) that satisfy the adjusted threshold.

Figure 2:
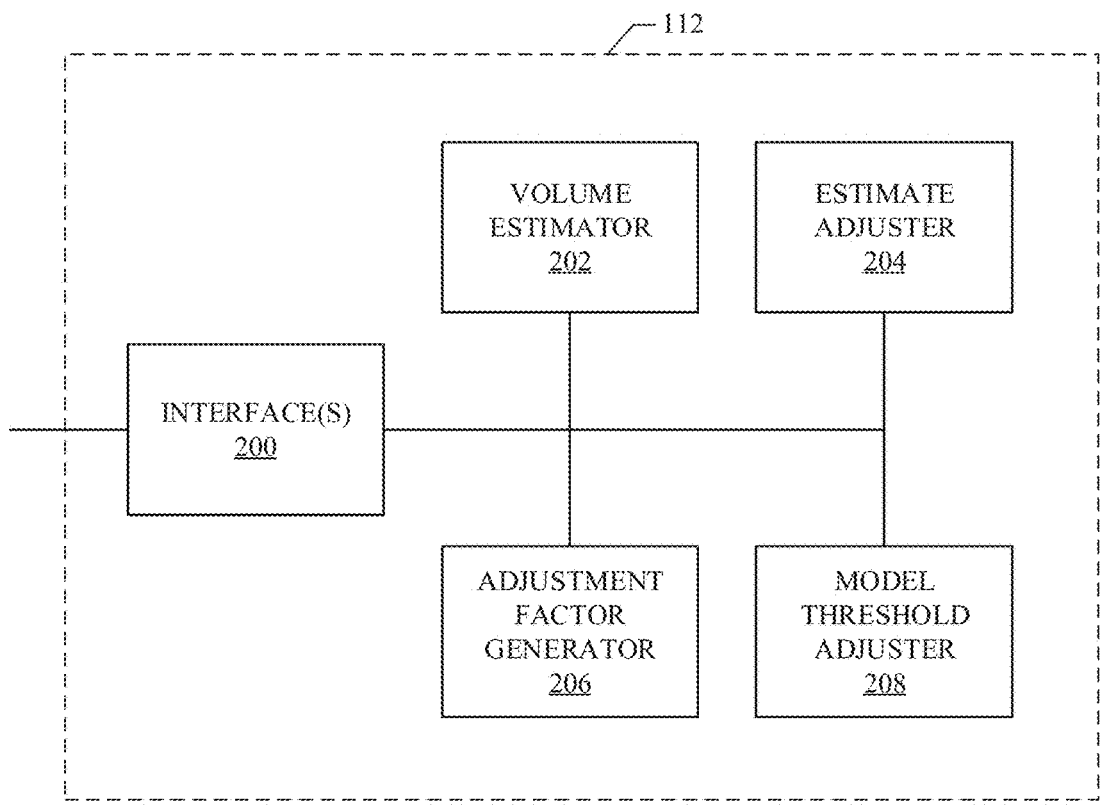
FIG. 2 is a block diagram of an example model analyzer of FIG. 1.

FIG. 2 is an example block diagram of the example model analyzer 112 of FIG. 2, disclosed herein, to dynamically adjust model thresholds. While the example model analyzer 112 is described in conjunction with the example model analyzer 112 of FIG. 1, the model analyzer 112 may be utilized to adjust model thresholds from any model. The example model analyzer 112 includes an example interface(s) 200, an example volume estimator 202, an example estimate adjuster 204, an example adjustment factor generator 206, and an example model threshold adjuster 208.

The example interface(s) 200 of FIG. 2 receives user model parameters, model data from the example model database 110, volume data from the example user database 106, and current settings from the example model database 110. Additionally, the example user interface(s) 200 transmits (e.g., deploys) models with adjusted model thresholds to the example data segment generator 114.

The example volume estimator 202 of FIG. 2 estimates a modeled volume (e.g., total) based on model data from a lookback window. A lookback window includes all data from a duration corresponding to the currently analyzed model from a preset time to the current time. In some examples, the preset time corresponds to the last time the model threshold was adjusted. Alternatively, the preset time of time may be a day from the current time, a week from the current time, a month from the current, etc. In some examples, the volume estimator 202 projects the data from the duration to a second, longer, duration of time corresponding to the example data segment 101. For example, the volume estimator 202 may identify 10 million deterministic and modeled users for a model based on a lookback window of one week and project the 10 million users to 43 million users to generate a 30-day modeled volume used to generate the example data segment 101 of FIG. 1.

The example estimate adjuster 204 of FIG. 2 adjusts the volume estimate generated by the example volume estimator 202 to satisfy different conditions. For example, the conditions may include a desired ratio of a modeled estimates total to a sum of a deterministic estimates total and the modeled estimates total. The estimate adjuster 204 may determine the deterministic estimate total from the volume estimate generated by the example volume estimator 202. For example, the volume estimate for a particular model may be 40 million users, including both deterministic estimates and modeled estimates. The example estimate adjuster 204 may determine that 39 million of the 40 million users are included in the deterministic estimates and 1 million estimates are included in the modeled estimates. The example estimate adjuster 204 determines that ratio of the modeled estimates total to the volume estimate is 2.5% (e.g., 1/40). The example estimate adjuster 204 may adjust the modeled estimates to satisfy a minimum modeled threshold. For example, if the minimum modeled threshold is 25%, then the example estimate adjuster 204 adjusts the modeled estimates to satisfy the 25% minimum $$\left(\text{e.g., } \frac{x}{x+y} = 0.25,\right.$$

where x is the model estimates total and y is the deterministic estimates total). Using the above example, the estimate adjuster 204 adjusts the modeled estimates from 1 million to 13 million $$\left(\text{e.g., } \frac{x}{x+39} = 0.25, x = 13\right).$$

The example estimate adjuster 204 adjusts the modeled estimates by increasing the number of modeled users. Additionally, the example estimate adjuster 204 may adjust the modeled estimates to increase the volume estimates total to satisfy the target volume target. For example, if the volume estimates total is 40 million, the ratio of modeled estimates total to volume estimates total is above the minimum modeled threshold, and the total volume target is 50 million, the example estimate adjuster 204 may increase the estimates total by an additional 10 million modeled users to increase the volume estimates total to 50 million. The example estimate adjuster 204 determines the sum of the adjusted model estimates total and the deterministic estimates total. The sum of the adjusted model estimates total and the deterministic estimates total is herein referred to as the adjusted volume target. In some examples, such as when the minimum model threshold and the total volume target are already satisfied, the example estimate adjuster 204 may not adjust the volume estimates from the example volume estimator 202. In such examples, the adjusted volume target is the same as the total volume target.

The example adjustment factor generator 206 of FIG. 2 determines an adjustment factor based on the sum of the model estimates total and the deterministic estimates total after being, or not being, adjusted by the example estimate adjuster 204 (e.g., the adjusted volume target). The example adjustment factor generator 206 computes the adjustment factor by dividing the adjusted volume target generated by the example estimate adjuster 204 by the volume estimate generated by the example volume estimator 202. For example, when the volume estimate is 40 million and the adjusted volume target is 52 million, the example adjustment factor computes an adjustment factor of 1.3 (e.g., 52/40=1.3).

The example model threshold adjuster 208 of FIG. 2 adjusts the model threshold applied to a particular model to satisfy the total volume target for a sample using the adjustment factor generated by the example adjustment factor generator 206. The sample corresponds to an absolute count of users that satisfies the currently utilized model threshold for a particular period of time. The currently utilized model threshold is obtained from the example model database 110 using an intelligent scan of the example model database 110. In some examples, the sample corresponds to the absolute count of users that satisfies the current model threshold for the duration of time that the current model threshold has been implemented. The example model threshold adjuster 208 applies the adjustment factor calculated by the example adjustment factor generator 206 to the absolute count of users to determine an adjusted count of users that corresponds to the total volume target for the example data segment 101 of FIG. 1. For example, if the absolute count of users that satisfy a model threshold of 0.75 is 1 million for a two-day sample and/or a percent sample (e.g., 5% random sample of all data received during a two-day period) and the adjustment factor is 1.3, the example model threshold adjuster 208 determines that the adjusted count of users is 1.3 million (e.g., 1 million*1.3).

Once the example model threshold adjuster 208 of FIG. 2 determines the adjusted count of users, the example model threshold adjuster 208 analyzes model score data to adjust the model threshold to a model threshold that best corresponds to the adjusted count of users. In some examples, such as when the model score data is a cumulative model (e.g., each model score includes a number of users that has a score greater than or equal to the model score), the example model threshold adjuster 208 identifies the model score whose cumulative number of users that is closest to the adjusted count of users. If the model score data is not cumulative (e.g., each model score includes a number of users that has the model score), the example model threshold adjuster 208 adjusts the model threshold one step at a time to determine when the total number of users that satisfies the model threshold score is closest to the adjusted count of users, as further described in conjunction with FIG. 4.

While example manners of implementing the example model analyzer 112 of FIG. 1 is illustrated in FIG. 2, elements, processes and/or devices illustrated in FIG. 2 may be combined, divided, re-arranged, omitted, eliminated and/or implemented in any other way. Further, the example interface(s) 200, the example volume estimator 202, the example estimate adjuster 204, the example adjustment factor generator 206, the example model threshold adjuster 208, and/or, more generally, the example model analyzer 112 of FIG. 2, may be implemented by hardware, machine readable instructions, software, firmware and/or any combination of hardware, machine readable instructions, software and/or firmware. Thus, for example, any of the example interface(s) 200, the example volume estimator 202, the example estimate adjuster 204, the example adjustment factor generator 206, the example model threshold adjuster 208, and/or, more generally, the example model analyzer 112 of FIG. 2 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface(s) 200, the example volume estimator 202, the example estimate adjuster 204, the example adjustment factor generator 206, the example model threshold adjuster 208, and/or, more generally, the example model analyzer 112 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example model analyzer 112 of FIG. 2 includes elements, processes and/or devices in addition to, or instead of, those illustrated in FIGS. 3 and 4, and/or may include more than one of any or all of the illustrated elements, processes and devices.

Figure 3:
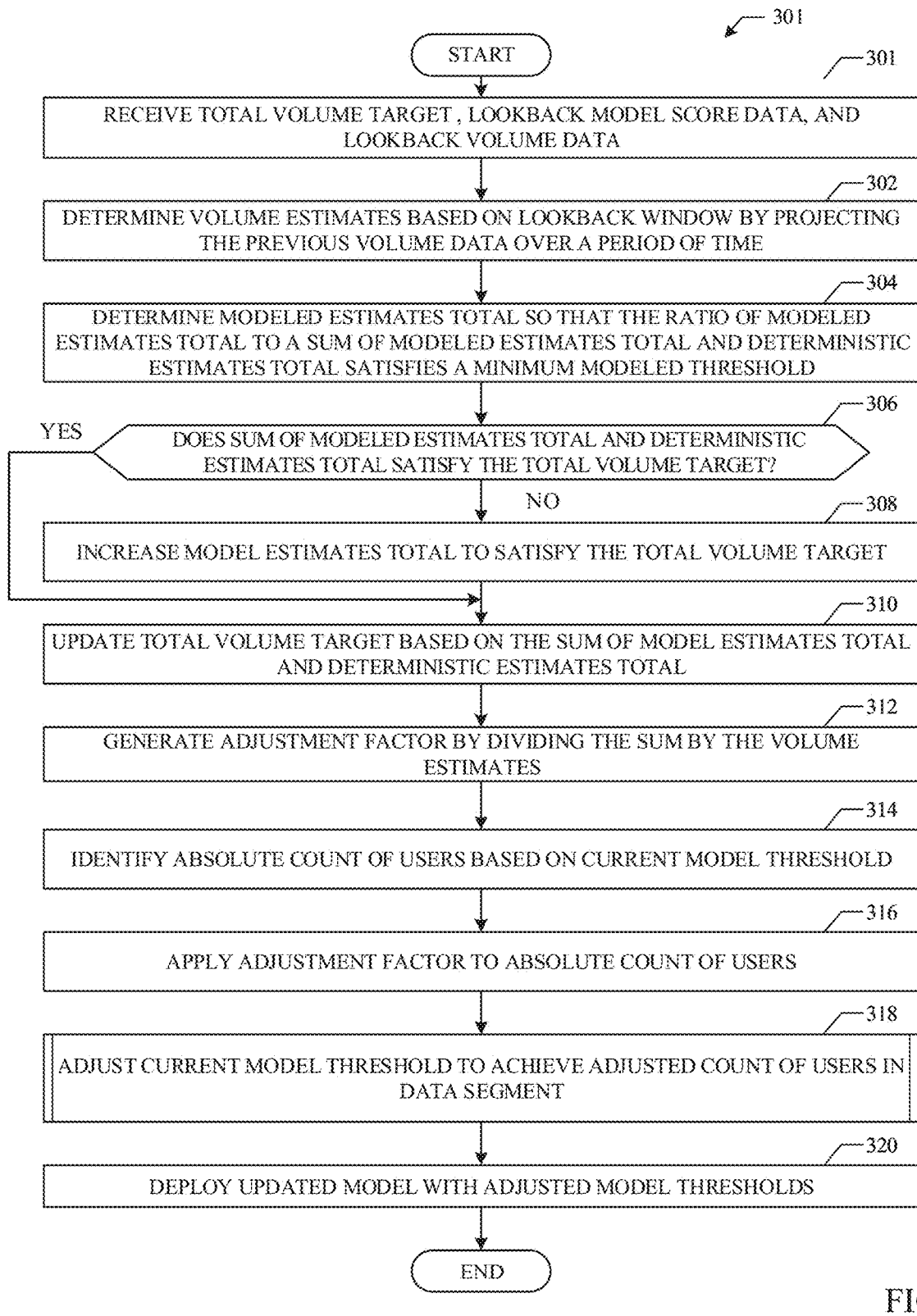
FIGS. 3-4 are flowcharts representative of example machine readable instructions that may be executed to implement the example model analyzer of FIGS. 1 and 2 to adjust model thresholds.
Figure 4:
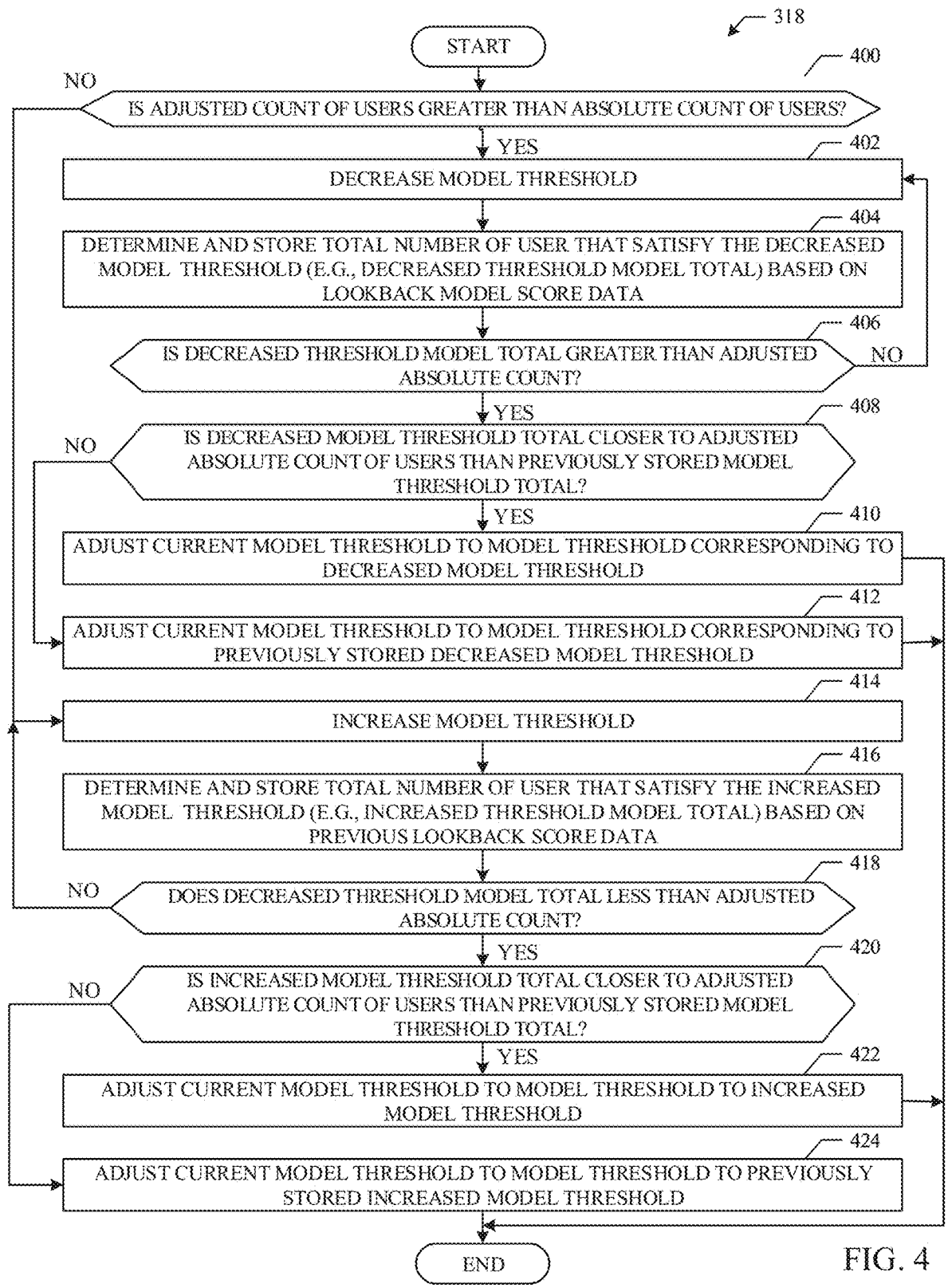

A flowchart representative of example machine readable instructions for implementing the example model analyzer 112 of FIG. 1 is shown in FIGS. 3 and 4. In the examples, the machine readable instructions comprise a program for execution by a processor such as the processor 512 shown in the example processor platform 500 discussed below in connection with FIG. 5. The program may be embodied in machine readable instructions stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIGS. 3 and 4, many other methods of implementing the example model analyzer 112 of FIGS. 1 and 2 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart 300 representative of example machine readable instructions that may be executed by the example model analyzer 112 of FIGS. 1 and 2 to adjust model thresholds corresponding to the example data segment 101 of FIG. 1. Although the instructions of FIG. 3 are described in conjunction with the example model analyzer 112 of FIGS. 1 and 2, the example instructions may be utilized by any type of model analyzer.

At block 301, the example interface(s) 200 receive a total volume target for the example data segment 101, previous model score data, and previous volume data. The total volume target refers to a total number of users, both deterministic and modeled, that should be included in the example data segment 101 (e.g., the total number of users that satisfies the model threshold). In some examples the total volume target corresponds to a universe of users. The lookback model data includes data related to how the example score determiner 108 scores the users of the example user database 106 with a lookback window (e.g., a predetermined amount of time). For example, lookback model data may include the total number of users that received each available score within a 5-day lookback window (e.g., from 5 days ago until now). The lookback volume data identifies the volume of users that satisfied the current and/or previous model threshold within the lookback window. In some examples, the lookback volume data includes both modeled and deterministic breakdowns of lookback window. For example, the lookback volume data may determine that based on a 5-day lookback window at a model threshold of 0.75, 10.5 million users satisfied the model threshold and/or were included in deterministic segments corresponding to the model, where 7.2 million are deterministic users and 3.3 million are modeled users.

At block 302, the example volume estimator 202 determines volume estimates based on a lookback window by projecting the lookback volume data over a period of time. In some examples, the period of time may be the period of time corresponding to the data segment 101. For example, if the data segment 101 includes data from a 30-day period, the example volume estimator 202 determines volume estimates by projecting the volume data of the lookback window to the 30-day period. In such an example, if the lookback window is five days and the total volume of the lookback window is seven million users (e.g., 3 million deterministic and 4 million modeled), then the example volume estimator 202 multiplies the seven million users for the five-day period by six to determine a volume estimate total of forty-two million users (e.g., 18 million deterministic and 22 million modeled). The volume estimates include a modeled estimates total (e.g., the estimated number of modeled users projected over the time period) and a deterministic estimates total (e.g., the estimated number of deterministic users projected over the time period).

At block 304, the example estimate adjuster 204 determines a modeled estimates total so that the ratio of the modeled estimates total and the deterministic estimates total satisfies a minimum modeled threshold. For example, if the deterministic estimates total is thirty-nine million users, the example estimate adjuster 204 determines that in order to meet a minimum modeled threshold of 25%, for example, the modeled estimates total should be at least 13 million modeled users.

$$\left(\text{e.g., } \frac{x}{x+39} = \frac{1}{4} \rightarrow x = 13\right).$$

At block 306, the example estimate adjuster 204 determines if the sum of the modeled estimates total and the deterministic estimates total satisfies the total volume target. Using the above example, the estimate adjuster 204 determines that the sum of the modeled estimates total and the deterministic estimates total is 52 million (e.g., 39 million deterministic and 13 million modeled). If the received total volume target is 50 million, for example, the example estimate adjuster 204 determines that the sum of the modeled estimates total and deterministic estimates total (e.g., 52 million) satisfies (e.g., is greater than or equal to) the total volume target (e.g., 50 million). If, however, the received total volume target is 80 million, for example, the example estimate adjuster 204 determines that the sum of the modeled estimates total and the deterministic estimates total (e.g., 52 million) does not satisfy (e.g., is less than) the total volume target (e.g., 80 million).

If the example estimate adjuster 204 determines that the sum of the modeled estimates total and the deterministic estimates total satisfies the total volume target (block 306: YES), the process continues to block 310. If the example estimate adjuster 204 determines that the sum of the modeled estimates total and the deterministic estimates total does not satisfy the total volume target (block 306: NO), the example estimate adjuster 204 increases the model estimates total to satisfy the total volume target (block 308). For example, if the model estimates total is 13 million, the deterministic estimates total is 39 million (e.g., the sum of the modeled estimates total and the deterministic estimates total being 52 million), and the total volume target is 80 million, the example estimate adjuster 204 increases the model estimates total of 13 million by 28 million (e.g., 80 million–52 million) to get a modeled estimates total of 41 million. In this manner, both the total volume target and the minimum modeled threshold are satisfied.

At block 310, the example estimate adjuster 204 updates the total volume target based on the sum of the modeled estimates total and the deterministic estimates totals that satisfy the minimum model threshold and/or the total volume target. For example, if the sum of the modeled estimates total and the deterministic estimates total is 52 million and the total volume target is 50 million, the example estimate adjuster 204 updates the total volume target to 52 million. In some examples, the sum of the modeled estimates total and the deterministic estimates total that satisfies the minimum model threshold and/or total volume target will be the same as the total volume target. In such examples, the total volume target may not be updated.

At block 312, the example adjustment factor generator 206 generates an adjustment factor by dividing the sum of the modeled estimates total and the deterministic estimates total by the volume estimates determined by the example volume estimator 202. For example, if the sum is 52 million and the volume estimates is 42 million, the adjustment factor generator 206 generates an adjustment factor of 1.24 (e.g., 52/42). At block 314, the example model threshold adjuster 208 identifies the absolute count of users based on the current model threshold. The absolute count of users corresponds to the deterministic data and modelled data from the lookback volume data (e.g., the total number of users that satisfied the current model threshold and the deterministic total of the model within the lookback period).

At block 316, the example model threshold adjuster 208 applies the adjustment factor to the absolute count of users. For example, if the absolute count of users during a lookback period is 3 million users and the adjustment factor is 1.24, the example model threshold adjuster 208 multiplies the adjustment factor by the absolute count of users to generate an adjusted count of users of 3.72 million users. At block 318, the example model threshold adjuster 208 adjusts the current model threshold to achieve the adjusted count of users (e.g., 3.72 million) in the data segment corresponding to the model. For example, if the current model threshold is set to 0.75 and applying the 0.75 model threshold, the data segment will include 2.1 million users, the example model threshold adjuster 208 will decrease the model threshold to a lower score to increase the number of users to a number closer to 3.72 million adjusted count of users, as further described below in conjunction with FIG. 4. At block 320, the example interface(s) 200 deploys the updated model with the adjusted model thresholds. In some examples, the interface(s) 200 deploys the updated model to by stored in the example model database 110. In some examples, the interface(s) 200 deploys the updated model to the example data segment generator 114 to generate the example data segment 101.

FIG. 4 is an example flowchart 318 representative of example machine readable instructions that may be executed to implement the example model analyzer 112 of FIGS. 1 and 2 to adjust the current model threshold to achieve an adjusted count of users in the example data segment 101, as described above in conjunction with block 318 of FIG. 3. Although the instructions of FIG. 3 are described in conjunction with the example model analyzer 112 of FIGS. 1 and 2, the example instructions may be utilized by any type of model analyzer.

At block 400, the example model threshold adjuster 208 determines if the adjusted count of users (e.g., after applying the adjustment factor) is greater than the absolute count of users. The adjusted count of users is greater than the absolute count of users when the adjustment factor is greater than one. The adjusted count of users is less than the absolute count of users when the adjustment factor is less than one. If the example model threshold adjuster 208 determines that the adjusted count of users is greater than the absolute count of users (block 400: YES), the example model threshold adjuster 208 decreases the model threshold to the next highest available model threshold (block 402). For example, if the current model threshold is 0.57 and the model thresholds are 0.01 units apart, the example model threshold adjuster 208 decreases the model threshold to 0.56.

At block 404, the example model threshold adjuster 208 determines and stores the total number of users that satisfy the decreased model threshold (e.g., the decreased threshold model total) based on the previous model score data. For example, if the lookback model score data includes a total number of users that received a particular model score, the example model threshold adjuster 208 sums up the totals for each model score from 0.56 to the maximum model score (e.g., 1.00). In such an example, the example model threshold adjuster 208 may determine that 3.1 million users satisfy the 0.56 model threshold. Additionally, the example model threshold adjuster 208 stores the 3.1 million in association with the 0.56 model threshold.

At block 406, the example model threshold adjuster 208 determines if the decreased threshold model total (e.g., 3.1 million) is greater than the adjusted absolute count (e.g., 3.72 million). If the example model threshold adjuster 208 determines that the decreased threshold total (e.g., 3.1 million) is not greater than the adjusted absolute count (e.g., 3.72 million) (block 406: NO), the process returns to block 402 to continue to decrease the model threshold until the decreased threshold total is greater than the adjusted absolute count. If the example model threshold adjuster 208 determines that the decreased threshold total is greater than the adjusted absolute count (block 406: YES), the example model threshold adjuster 208 determines if the decreased model threshold total is closer to the absolute count of users than the previously stored model threshold total (block 408). For example, if the decreased threshold total for 0.50 is 3.8 million and the decreased threshold total for 0.51 is 3.7 million, the example model threshold adjuster 208 would determine that the previously stored decreased model threshold total (e.g., 3.7 million) corresponding to the model threshold of 0.51 is closer to the adjusted absolute count of users (e.g., 3.72 million) than the current model threshold total (e.g., 3.8 million) corresponding to 0.50.

If the example model threshold adjuster 208 determines that the decreased model threshold total is closer to the adjusted absolute count of users than the previously stored model threshold total (block 408: YES), the example model threshold adjuster 208 adjusts the current model threshold to the model threshold corresponding to the decreased model threshold total (block 410). If the example model threshold adjuster 208 determines that the decreased model threshold total is not closer to the adjusted count of users than the previously stored model threshold total (block 408: NO), the example model threshold adjuster 208 adjusts the current model threshold to the model threshold corresponding to the previously stored decreased model threshold total (block 412). Alternatively, the example model threshold adjuster 208 may select a stored model threshold corresponding to a model threshold total that includes more than the adjusted absolute count, as opposed to a model threshold corresponding to a model threshold total closest to the absolute count.

Returning to block 400, if the example model threshold adjuster 208 determines that the adjusted count of users is not greater than the absolute count of users (block 400: NO), the example model threshold adjuster 208 increases the model threshold to the next lowest available model threshold (block 414). For example, if the current model threshold is 0.57 and the model thresholds are 0.01 units apart, the example model threshold adjuster 208 increases the model threshold to 0.58.

At block 416, the example model threshold adjuster 208 determines and stores the total number of users that satisfy the increased model threshold (e.g., the increased threshold model total) based on the previous model score data. For example, if the lookback model score data includes a total number of users that received a particular model score, the example model threshold adjuster 208 sums up the totals for each model score from 0.58 to the maximum model score (e.g., 1.00). In such an example, the example model threshold adjuster 208 may determine that 4.2 million users satisfy the 0.58 model threshold. Additionally, the example model threshold adjuster 208 stores the 4.2 million in association with the 0.58 model threshold.

At block 418, the example model threshold adjuster 208 determines if the increased threshold model total (e.g., 4.2 million) is less than the adjusted absolute count (e.g., 3.72 million). If the example model threshold adjuster 208 determines that the increased threshold total (e.g., 4.2 million) is not less than the adjusted absolute count (e.g., 3.72 million) (block 418: NO), the process returns to block 414 to continue to increase the model threshold until the increased threshold total is less than the adjusted absolute count. If the example model threshold adjuster 208 determines that the increase threshold total is less than the adjusted absolute count (block 418: YES), the example model threshold adjuster 208 determines if the increased model threshold total is closer to the absolute count of users than the previously stored model threshold total (block 420). For example, if the increased threshold total for 0.60 is 3.6 million and the increased threshold total for 0.59 is 3.8 million, the example model threshold adjuster 208 would determine that the previously stored increased model threshold total (e.g., 3.8 million) corresponding to the model threshold of 0.59 is closer to the adjusted absolute count of users (e.g., 3.72 million) than the current model threshold total (e.g., 3.6 million) corresponding to 0.60.

If the example model threshold adjuster 208 determines that the increased model threshold total is closer to the adjusted absolute count of users than the previously stored model threshold total (block 420: YES), the example model threshold adjuster 208 adjusts the current model threshold to the model threshold corresponding to the increased model threshold total (block 422). If the example model threshold adjuster 208 determines that the increased model threshold total is not closer to the adjusted absolute count of users than the previously stored model threshold total (block 420: NO), the example model threshold adjuster 208 adjusts the current model threshold to the model threshold corresponding to the previously stored increased model threshold total (block 424). Alternatively, the example model threshold adjuster 208 may select a stored model threshold corresponding to a model threshold total that includes less than the adjusted absolute count, as opposed to a model threshold corresponding to a model threshold total closest to the absolute count.

Figure 5:
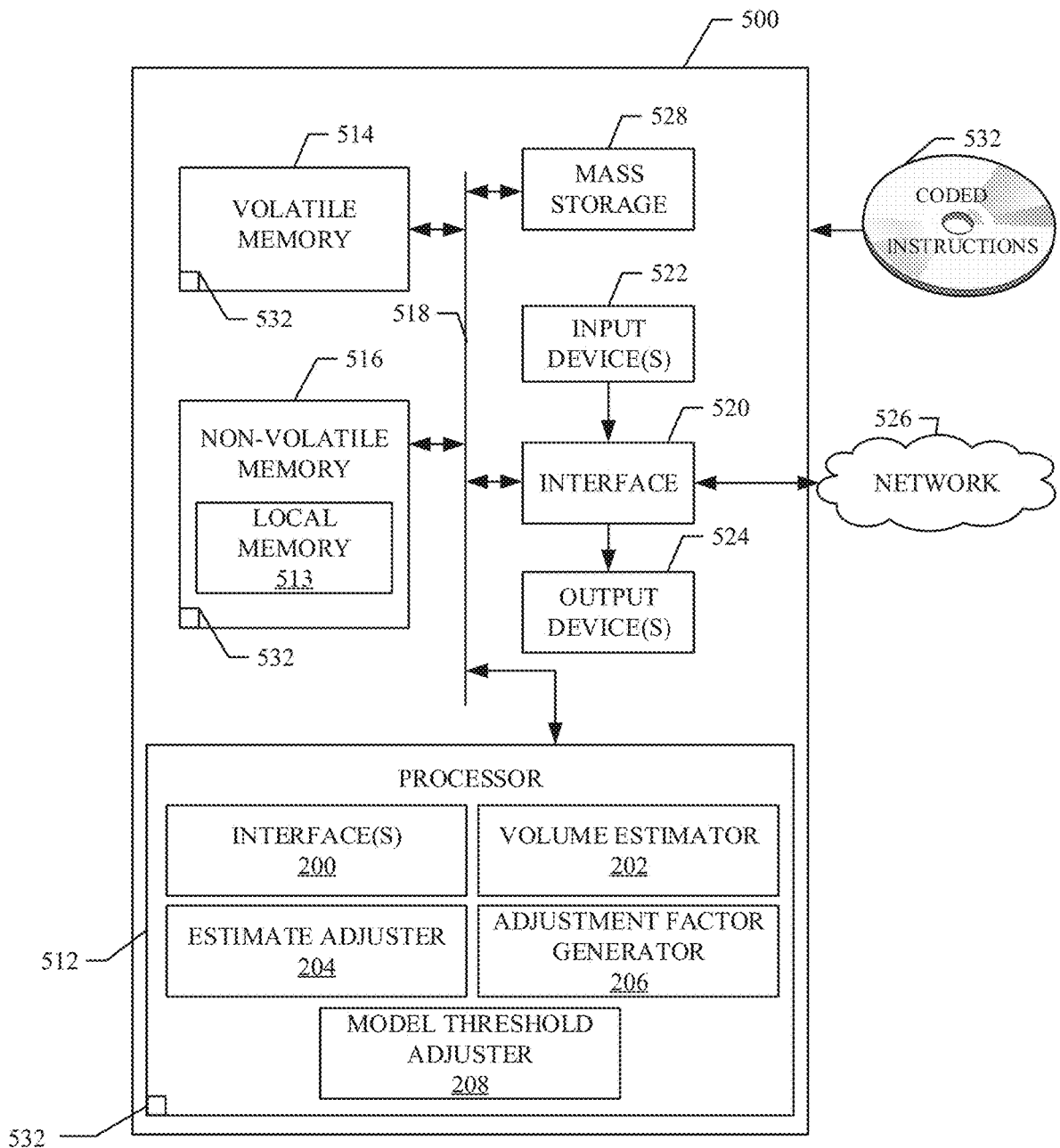
FIG. 5 is a block diagram of a processor platform structured to execute the example machine readable instructions of FIGS. 3 and 4 to control the example model analyzer of FIGS. 1 and 2.

FIG. 5 is a block diagram of an example processor platform 500 capable of executing the instructions of FIG. 3 to implement the example model analyzer 112 of FIGS. 1 and 2. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by integrated circuits, logic circuits, microprocessors or controllers from any desired family or manufacturer.

The processor 512 of the illustrated example includes a local memory 513 (e.g., a cache). The example processor 512 of FIG. 5 executes the instructions of FIG. 3 to implement the example interface(s) 200, the example volume estimator 202, the example estimate adjuster 204, the example adjustment factor generator 206, and/or the example model threshold adjuster 208 of FIG. 2 to implement the example model analyzer 112. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a clock controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIGS. 3 and 4 may be stored in the mass storage device 528, in the volatile memory 514, in the non-volatile memory 516, and/or on a removable tangible computer readable storage medium such as a CD or DVD.

From the foregoing, it would be appreciated that the above disclosed method, apparatus, and articles of manufacture adjust model threshold levels in data segment generation. Examples disclosed herein increase revenue by maintaining a minimum ratio of modeled users to total users that satisfy a model threshold. Additionally, examples disclosed herein increase revenue by increasing the number of modeled users to achieve a total volume target that is representative of a universe of users. Using examples disclosed herein, models may be updated in substantially real-time to meet market demands and increase revenue in a constantly fluctuating environment.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. An apparatus comprising:
    an estimate adjuster to, when a ratio of (A) a number of modeled users that satisfy a model threshold within a first period of time to (B) a sum of the number of the modeled users that satisfy the model threshold and a number of deterministic client device users does not satisfy a minimum ratio threshold, increase the number of modeled users to satisfy the model threshold;
    an adjustment factor generator to generate an adjusted count of users by applying an adjustment factor based on volume estimates and an updated total volume target to an absolute count of users, the volume estimates corresponding to the number of users that satisfy the model threshold within the first period of time; and
    a model threshold adjuster to adjust the model threshold based on the adjusted count of users.

2. The apparatus of claim 1, wherein the volume estimates include a number of client device users and a number of modeled client device users.

3. The apparatus of claim 1, wherein volume estimator is to determine the volume estimates by determining a first volume estimate corresponding to a second number of users that satisfy the model threshold within a second period of time and projecting the second number of users based on a difference between the first period of time and the second period of time.

4. The apparatus of claim 1, wherein the updated total volume target is a total volume target updated based on the increased number of modeled users, the total volume target is a number of users that satisfy the model threshold to be included in a data segment, and the number of users includes a number of client device users and a number of modeled users.

5. The apparatus of claim 1, wherein the updated total volume target is the sum of the increased number of modeled users that satisfy the model threshold and client device users that satisfy the model threshold.

6. The apparatus of claim 1, wherein the adjustment factor generator is to generate the adjustment factor by dividing the updated total volume target by the volume estimates.

7. The apparatus of claim 1, wherein the absolute count of users is a number of client device users and a number of model users that satisfy the model threshold within a second period of time.

8. The apparatus of claim 1, wherein the estimate adjuster is to adjust the model threshold based on the adjusted count of users by determining a model threshold value that, when applied to a model, changes the absolute count of users to a count nearest to the updated total volume target.

9. The apparatus of claim 1, wherein the estimate adjuster is to adjust the model threshold by:
    determining a decreased model threshold, the decreased model threshold being less than the model threshold;
    determining a decreased model total based on lookback model score data, the decreased model total corresponding to a number of users that studies the decreased model threshold; and
    when a first difference between (A) the decreased model total and (B) adjusted absolute count of users is smaller than a second difference between (A) a model threshold total corresponding to the model threshold and (B) the adjusted absolute count of users, replacing the model threshold with the decreased model threshold.

10. The apparatus of claim 1, wherein the estimate adjuster is to adjust the model threshold by:
    determining an increased model threshold, the increased model threshold being more than the model threshold;
    determining an increased model total based on lookback model score data, the increased model total corresponding to a number of users that studies the increased model threshold; and
    when a first difference between (A) the increased model total and (B) adjusted absolute count of users is smaller than a second difference between (A) a model threshold total corresponding to the model threshold and (B) the adjusted absolute count of users, replacing the model threshold with the increased model threshold.

11. The apparatus of claim 1, further including an interface to deploy a model corresponding the adjusted model threshold, the model corresponding to a data segment including adjusted count of users.

12. The apparatus of claim 11, wherein the model further corresponds to a type of media, the deterministic client device users having been exposed to the type of media.

13. The apparatus of claim 1, wherein the estimate adjuster is to, when the ratio satisfies the minimum ratio threshold, maintain a total volume target corresponding to the updated total volume target.

14. The tangible computer readable storage medium of claim 1, wherein the instructions cause the one or more processors to, when the ratio satisfies the minimum ratio threshold, maintain a total volume target corresponding to the updated total volume target.

15. A tangible computer readable storage medium comprising instructions which, when executed, cause one or more processors to at least:
    when a ratio of (A) a number of modeled users that satisfy a model threshold within a first period of time to (B) a sum of the number of the modeled users that satisfy the model threshold and a number of deterministic client device users does not satisfy a minimum ratio threshold, increase the number of modeled users to satisfy the model threshold;
    generate an adjusted count of users by applying an adjustment factor based on volume estimates and an updated total volume target to an absolute count of users, the volume estimates corresponding to the number of users that satisfy the model threshold within the first period of time; and adjust the model threshold based on the adjusted count of users.

16. The tangible computer readable storage medium of claim 15, wherein the volume estimates include a number of client device users and a number of modeled client device users.

17. The tangible computer readable storage medium of claim 15, wherein the instructions cause the one or more processors to determine the volume estimates by determining a first volume estimate corresponding to a second number of users that satisfy the model threshold within a second period of time and projecting the second number of users based on a difference between the first period of time and the second period of time.

18. The tangible computer readable storage medium of claim 15, wherein the updated total volume target is a total volume target updated based on the increased number of modeled users, the total volume target is a number of users that satisfy the model threshold to be included in a data segment, and the number of users includes a number of client device users and a number of modeled users.

19. The tangible computer readable storage medium of claim 15, wherein the updated total volume target is the sum of the increased number of modeled users that satisfy the model threshold and client device users that satisfy the model threshold.

20. The tangible computer readable storage medium of claim 15, wherein the instructions cause the one or more processors to generate the adjustment factor by dividing the updated total volume target by the volume estimates.

21. The tangible computer readable storage medium of claim 15, wherein the absolute count of users is a number of client device users and a number of model users that satisfy the model threshold within a second period of time.

22. The tangible computer readable storage medium of claim 15, wherein the instructions cause the one or more processors to adjust the model threshold based on the adjusted count of users by determining a model threshold value that, when applied to a model, changes the absolute count of users to a count nearest to the updated total volume target.

23. The tangible computer readable storage medium of claim 15, wherein the instructions cause the one or more processors to adjust the model threshold by:

determining a decreased model threshold, the decreased model threshold being less than the model threshold;

determining a decreased model total based on lookback model score data, the decreased model total corresponding to a number of users that studies the decreased model threshold; and when a first difference between (A) the decreased model total and (B) adjusted absolute count of users is smaller than a second difference between (A) a model threshold total corresponding to the model threshold and (B) the adjusted absolute count of users, replacing the model threshold with the decreased model threshold.

24. The tangible computer readable storage medium of claim 15, wherein the instructions cause the one or more processors to adjust the model threshold by:

determining an increased model threshold, the increased model threshold being more than the model threshold;

determining an increased model total based on lookback model score data, the increased model total corresponding to a number of users that studies the increased model threshold; and when a first difference between (A) the increased model total and (B) adjusted absolute count of users is smaller than a second difference between (A) a model threshold total corresponding to the model threshold and (B) the adjusted absolute count of users, replacing the model threshold with the increased model threshold.

25. The tangible computer readable storage medium of claim 15, wherein the instructions cause the one or more processors to deploy a model corresponding the adjusted model threshold, the model corresponding to a data segment including adjusted count of users.

26. The tangible computer readable storage medium of claim 25, wherein the model further corresponds to a type of media, the deterministic client device users having been exposed to the type of media.

27. A method comprising:

when a ratio of (A) a number of modeled users that satisfy a model threshold within a first period of time to (B) a sum of the number of the modeled users that satisfy the model threshold and a number of deterministic client device users does not satisfy a minimum ratio threshold, increasing, by executing an instruction with a processor, the number of modeled users to satisfy the model threshold;

generating, by executing an instruction with the processor, an adjusted count of users by applying an adjustment factor based on volume estimates and an updated total volume target to an absolute count of users, the volume estimates corresponding to the number of users that satisfy the model threshold within the first period of time; and adjusting, by executing an instruction with the processor, the model threshold based on the adjusted count of users.

* * * * *